Patented Dec. 27, 1932

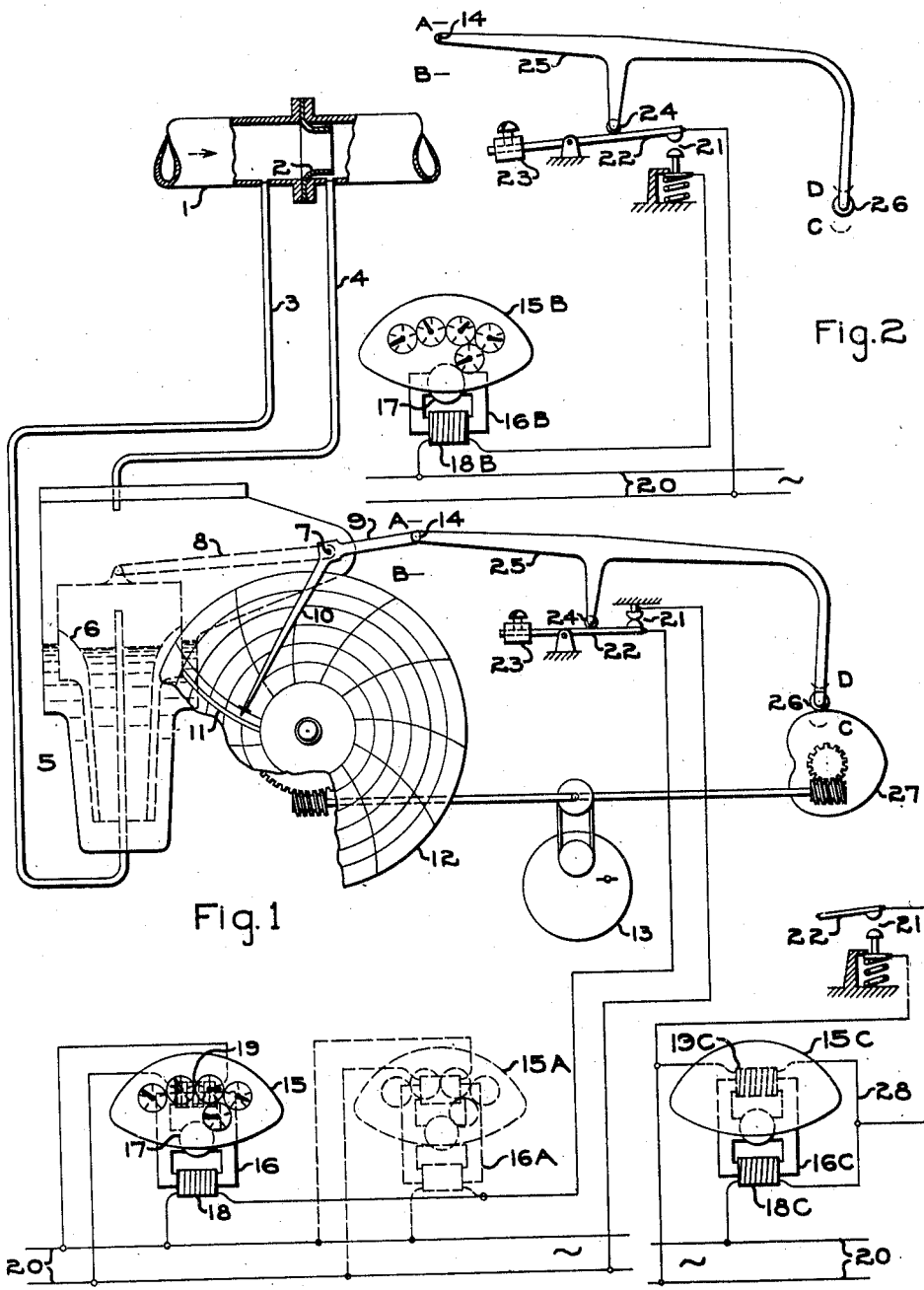

1,892,184

UNITED STATES PATENT OFFICE

REW E. WOOLLEY, OF SHAKER HEIGHTS, OHIO, ASSIGNOR TO BAILEY METER COMPANY, A CORPORATION OF DELAWARE

INTEGRATING MECHANISM

Application filed August 10, 1931. Serial No. 556,157.

This invention relates to improvements in mechanisms for the integration of variables, especially for integrating variables with respect to time, and where such variables may be of a physical, chemical, electrical, hydraulic or other nature.

Integrators are known to those familiar with the art which operate in basically different manners and of various mechanical constructions and designs. Such integrators, so far as I know, however, when actuated through the positioning of mechanical members representing functions of the variable to be integrated and functions of time or an independent variable with respect to which the variable is to be integrated, must be located in juxtaposition with the members which cause the actuation.

In my invention I provide an integrating mechanism or system wherein it is possible to locate the register, upon which the integrated result is to be accumulated, either adjacent or remote relative to the actuating members whose positions are determined responsive to that which is to be integrated.

One object of my invention is to provide an improved electrically actuated integrating mechanism.

Another object is to provide for driving an integrating register by means of a self-starting synchronous motor.

A further object is to provide an electrically operated integrating mechanism which may be located remotely at a considerable distance from its actuator.

Still another object is to provide a system for integrating a variable with respect to time wherein the register comprises an electric motor and which motor may be located at a considerable distance from the actuator.

With these and further objects in view, which will be made apparent, I will now describe the preferred embodiments of my invention illustrated in the drawing.

In the drawing:

Fig. 1 is a somewhat diagrammatic representation of my invention in connection with a rate of flow meter for fluids.

Fig. 2 is a view of a part of Fig. 1 comprising a modification thereof.

Fig. 3 is a view of a fragment of a further modification.

A variable such as the rate of flow of a fluid through the conduit 1 is desirably integrated with respect to time to give a total quantity of the fluid passing a given point during a specified interval of time such as the interval between two readings of the register. I show positioned within the conduit 1 a flow nozzle 2 forming a restriction to flow through the conduit and for creating thereby a pressure differential across the flow nozzle bearing a known relation to the rate of fluid flow therethrough. From the conduit 1 at opposite sides of the flow nozzle 2 I lead the pressure pipes 3 and 4 to a rate of flow meter indicated in general at 5.

Such a rate of flow meter may be of the liquid sealed bell type as disclosed in the patent to Ledoux No. 1,064,748 granted June 17, 1913, wherein the bell is shaped and has walls of material thickness to the end that the positioning of the bell is in direct proportion to the rate of fluid flow, thereby correcting for the quadratic relation which exists between rate of fluid flow through such a flow nozzle and differential pressure resulting therefrom. The bell is shown at 6 diagrammatically in dotted lines, and may be sealed by a liquid such as mercury whose approximate level within and without the bell is indicated.

Pressure within the conduit 1 ahead of the flow nozzle 2 is effective through the pipe 3 upon the interior of the bell 6, while pressure at the outlet of the flow nozzle 2 is effective through the pipe 4 upon the exterior of the bell 6, to the end that the bell is positioned vertically by the pressure differential across the flow nozzle and in linear relation to the rate of flow of the fluid.

Such vertical positioning of the bell results in angular positioning, about a fixed fulcrum point 7, of an arm 8 for transmitting motion from the bell to the shaft of the fulcrum 7, for positioning an arm 9 whose function will be explained hereinafter, and for positioning an indicating pen or pointer 10 cooperating with an index 11. The pen 10 is further adapted to record over a circular chart 12 which is desirably driven uniformly at a constant speed by a motor 13 which may be a spring wound motor such as a clock, or an electric motor.

I have shown the flow meter 5 in a position indicating a rate of flow approximately 20% of maximum, wherein the free end 14 of the arm 9 is in the shown position intermediate the positions A and B respectively indicating the position of the point 14 at zero rate of flow and at maximum rate of flow.

I provide in connection with the flow meter 5 a register 15, desirably remotely located from the flow meter 5, and having graduated dials with pointers moving in conjunction therewith, for affording a continuously available means of reading the accumulated total flow of fluid through the conduit 1, which total flow for any desired interval may be obtained by subtracting the reading of the dials of the register 15 at the beginning of the interval from the reading of the dials at the end of the interval, the difference between such readings representing the total flow between the beginning and the end of the interval of time, the arrangement being such that the total is the integration of the rate of flow of fluid with respect to time.

For driving the register 15 which in itself contains the necessary gear reduction between dials, I provide a self-starting single-phase synchronous motor 16 substantially independent of voltage changes and whose speed is directly and solely dependent upon the frequency of the alternating current supplied thereto.

The motor has a rotor 17 comprising inherent speed reducing gears and adapted to cooperate with and drive the internal gearing of the register 15 when rotating. As illustrated in Fig. 1, the motor 16 comprises two fields 18 and 19 oppositely arranged relative to the rotor 17 and across a source of alternating current 20.

With both field windings 18 and 19 energized across the alternating current source, opposing equal torques are developed thereby in the rotor 17, to the end that the rotor remains stationary. If the circuit is opened to one of the fields, such for example as the field 18, then the torque of the field 19 is made effective upon the rotor 17 for rotation of the rotor in a desired direction and corresponding actuation of the register 15 in a direction to increase the readings of the dials thereon.

When current is again applied to the field 18 after having been broken therefrom, the opposing torque, substantially instantaneously applied to the rotor 17, causes the rotor to cease rotation substantially instantaneously, to the end that overtravel of the pointers of the register 15 is minimized. If, for example, the field 19 has been energized, the rotor 17 rotates in predetermined direction and with a rotating torque determined in part at least by the difference between the line E. M. F. and the counter E. M. F. in the field 19. If now the field 18 is re-energized, the rotating torque of the field 19 is opposed by the sum of the line E. M. F. and the counter E. M. F. in the field 18 so that the stopping torque predominates the rotating torque by the sum of the two counter E. M. F.'s. Thus, when the second field is energized, stoppage of rotation occurs substantially instantaneously and without overtravel. The arrangement described is such that the rotation of the pointers relative to the indexes of the register 15 is in direct relation to the time of rotation of the rotor 17 and correspondingly to the time during which current is off from the field coil 18, which is attained through breaking of the circuit to the field 18.

I therfore provide a register for indicating the summation or integration of variables, operated by electrically actuated means and which may be remotely positioned from the actuator, the interconnection therebetween comprising electric conductors. At the point which I term the actuating point I provide a means for making and breaking circuit to the field 18, arranged so that the length of time during which the circuit is broken is representative of the amount of actuation I desire to impart to the register remotely located; I preferably divide time into definite intervals and break the electric circuit at the actuator during each interval of time, for an increment of time length determined by the value of the variable to be integrated with respect to time, in this case the rate of fluid flow through the conduit 1. However, while the increment of time is in length primarily determined by the instantaneous value of the variable at the instant of initiating the increment, nevertheless the increment length is continuously modified throughout its duration in accordance with any change in the value of the variable throughout the duration of the increment.

While I have illustrated and will describe the operation in detail of the actuator mechanism, and the integrator mechanism and system in general, as applied to the integration of a variable such as the rate of fluid flow with respect to time, the concept of my invention which I have is that the variable to be integrated with respect to time need not be the rate of fluid flow but may be any desirable variable to be integrated with respect to time. Furthermore, the mechanism is not necessarily limited to an integration of a varriable with respect to time, but is capable of performing any integration of a variable with respect to an independent variable as represented by the expression:

$$\int_a^b f(x)\,dx$$

At the fluid meter 5 and in connection with the same I provide as an actuator, or transmitting element for the register 15, a circuit opening arrangement of which the contacts 21, when open circuited, opens one line from the alternating current source 20 to the field coil 18 of the motor 16. One of the contacts 21 is rigidly held, while the other is carried at one end of a pivoted bar 22, having a counterweight 23 to cause normal engagement between the contacts 21, and adapted to be positioned for a separation of the said contacts through engagement with the bar 22 of a roller 24 carried by a freely floating member 25 capable of being positioned along a definite path in a single plane in space. The member 25 is pivotally connected at one end to the arm 9 of the flow meter at 14, so that that end of the member 25 is at the position A when there is zero flow through the conduit 1, and at a position B when there is a maximum flow through the conduit 1, thus traversing a predetermined path in a single plane in space.

The opposite end of the member 25 carries a roller 26 which by gravity bears against and in contact with the surface of a cam 27, in a manner such that that end of the member 25 is continually reciprocated at a substantially uniform speed between the limits of travel C and D through rotation of the cam 27 driven by the motor 13. The chart 12, for example, may be arranged to make one revolution in 24 hours, while the speed of the cam 27 might be in the nature of one revolution in ten seconds. It will be seen then that the member 25 is arranged for positioning along a definite path within limits of travel in a single plane in space, such that movement of the member is angularly about either end by the positioning of the opposite end between definite limits of travel, so that the actuating point 24 assumes a position between limits of travel in dependence upon the position of the point 14 and of the roller 26.

Thus at any given rate of fluid flow corresponding to a definite position of the point 14, the actuating point 24 is reciprocated along a definite path in the plane of movement of the member 25 and by the reciprocation between the limits C and D of the roller 26. When the rate of flow is zero and the point 14 is at the location A, then the reciprocation of the roller 24, through reciprocation of the roller 26, will not cause engagement between the actuating point and the bar 22. However, when the point 14 is at B, then the roller 24 may bear against the bar 22 throughout the entire or major portion of the reciprocation between the points C and D of the roller 26.

It will be seen that when the actuating point of the roller 24 engages the bar 22, the contacts 21 are open circuited and actuation of the register 15 is effected, through the releasing of one of the equal opposing torques. Thus, the length of time through which the contacts 21 are open circuited and the register 15 is being driven is determined by that portion of the time cycle of the cam 27 through which the actuating point of the roller 24 engages the bar 22 and such portion is determined by the position of the point 14 along the path A—B.

As the cam 27 is rotated, the position of the point 14 determines what portion of such rotation is used for driving the register 15 through open circuiting the contacts 21, but the drive is continually modified through the fact that the point 14 is free to change its position along the path A—B during actuation of the register 15. Thus the increment of movement of the register 15 for each revolution of the cam 27, i. e., for each time interval, is a function of the rate of flow throughout that interval.

Certain features of the actuator arrangement, and relationship desirably existing between the location of various parts of the mechanism are not claimed herewith, but are disclosed and claimed in the co-pending application Serial No. 556,153 of Harvard H. Gorrie, filed of even date herewith, and having the same assignee.

It will be understood that when I speak of one end of the member 25 being reciprocated between predetermined definite limits of travel C—D, I mean that the point of contact of the roller 26 with the cam 27 moves between the limits C—D.

When I speak of the other end of the member 25 being positioned or reciprocated between the limits of travel A—B, I mean on that end the pivot point 14 which in its extremes of travel lies on the line A or the line B.

By the reciprocation of the actuating point I mean that movement of the point of contact between the roller 24 and the bar 22.

It will be understood that in referring to reciprocation I do this broadly, and do not limit myself to reciprocation along an exactly straight line in both directions, but mean such reciprocation modified by angularity or similar effect as is well known in the type of linkage connections and arrangement disclosed herein. For example, while I state that the contact point of the roller 26 with the cam 27 is reciprocated between the limits C and D, the point of contact does not definitely follow a single straight line between these limits, for this depends upon the position of the pivot point 14 between its limits of travel at the time of reciprocation of the other end of the member 25. However, for the purpose of illustration the reciprocation between the limits C—D is substantially along a single straight line. The positioning of the pivot point 14 between the limits A—B follows substantially a single path, but the movement of the actuating point may vary slightly from a straight line, dependent upon relative positions of the two ends of the member 25. To all intents and purposes the movements of the two ends of the member and of the actuating point are along single straight lines in the plane of movement of the member 25, for I can readily take care of correcting for angularity or other well known effects through proportioning of moment arms, design of the cam 27, etc.

I illustrate in Fig. 1 the register motor 16 connected to the actuator by electric conductors and arranged to be located adjacent or remotely relative to the actuator. I further show additional registers such as the register 15A, having a driving motor 16A and which may be similar to those disclosed herein and may be located adjacent the register 15 or remotely therefrom as desired. The arrangement is such that from an actuator comprising a means for periodically open circuiting the contacts 21 for an increment of time in functional relation to a variable to be integrated with respect to time, I control remotely or locally electrically actuated integrators of substantially unlimited plurality and which may be all or in part located adjacent or remotely relative to the actuator.

In Fig. 2 I show a fragment of the arrangement of Fig. 1 comprising a modification thereof. I show as duplicating Fig. 1 only those parts of the arrangement of Fig. 1 which are required to illustrate the modification, namely the arrangement of the contacts 21 normally open-circuited rather than normally close-circuited as I showed in Fig. 1.

I show the register 15B as arranged for operation by a motor 16B which differs from the motors 16 and 16A of Fig. 1 in that it has but one field winding, for operating the rotor 17 in a single direction and being normally deenergized for non-rotation of the rotor. When actuation of the register 15B is desirably accomplished, the field 18B is energized, producing rotation of the rotor 17 in one direction and for the time interval of such energization.

Energization of the field 18B is accomplished through the closing of the circuit from the source of alternating current supply 20 through the contacts 21 by the actuating point of the roller 24 bearing against the bar 22 for a definite portion of the time cycle of the cam 27 as in the arrangement described for Fig. 1.

The two embodiments of my invention illustrated respectively in Fig. 1 and Fig. 2 are identical in that the actuating or transmitting mechanism serves to accomplish an actuation of a register which may be remotely located, through control of the rotation of a self-starting single phase synchronous motor for driving the register. The difference between the embodiments lying in the fact that in the one case non-rotation of the rotor is accomplished through the application of equal, oppositely acting torques through the simultaneous energization of two opposing fields, while in the other case the motor has a single field only and non-rotation of the register is accomplished through deenergization of the said field.

In Fig. 3 I illustrate a fragment of the arrangement of Fig. 1 embodying a modification thereof wherein certain features are similar to the features of Fig. 1, while other features are similar to the features of Fig. 2. For example, I illustrate the contacts 21 normally open-circuited which is like the contacts of Fig. 2, while I illustrate for the register 15C a driving motor 16C similar to the driving motors 16 and 16A of Fig. 1.

The distinguishing feature of the modification illustrated in Fig. 3 is the manner in which I connect the field windings 18C and 19C relative to each other, to the contacts 21 and to the source of alternating current 20. As in Fig. 1 the two field windings are oppositely arranged relative to the rotor of the motor 16C, and normally are both energized so that the equal opposing torques are effective in maintaining the rotor of the motor stationary until one of the fields is made ineffective, thereby releasing one of the equal opposing torques to allow the motor to rotate in one direction at a constant speed.

I have shown the field winding 18C having one lead connected to one side of the source 20, while the other lead joins the field winding 19C from the opposite end of which a lead connects to the other side of the alternating current source 20, to the end that the field windings 18C and 19C are connected in series across the source 20. From the two leads of the field coil 19C I carry conductors substantially any desirable distance to the remotely located actuator contact points 21. When the contact points 21 are closed I effect a shunting out of the field 19C, making it ineffective and connecting the field 18C directly across the alternating current source.

While I have illustrated and described certain preferred embodiments of my invention it is to be distinctly understood that I am not to be limited thereby except as to the claims appended hereinafter in view of prior art. For example, it is not necessary that the variable which I desire to integrate be rate of fluid flow, nor must such variable necessarily be integrated with respect to time. Furthermore, the mechanical and electrical construction and features as illustrated and described may be departed from, as will be readily understood by those familiar with the art, while still maintaining the features of the invention. Furthermore, I may effect a remote control of electrically actuated devices as illustrated and described, based on an integration of a variable with respect to an independent variable, but not necessarily actuating a register thereby. I may utilize other types of motors than those described, and otherwise vary the general arrangement, while still maintaining the spirit of the invention.

What I claim as new and desire to secure by Letters Patent of the United States, is:—

1. Apparatus for periodically remotely electrically effecting an actuation, comprising a member positioned by a time responsive element and by an element responsive to the value of a variable such as fluid rate of flow.

2. Apparatus for controlling an electric circuit, comprising a member positioned by a time responsive element and by an element positioned responsive to a variable such as fluid rate of flow.

3. Apparatus for controlling an electric circuit to effect an integration, comprising a member positioned by a time responsive element and by an element positioned responsive to a variable such as fluid rate of flow.

4. Apparatus for controlling an electric circuit, comprising a member positioned by an element which is responsive to the value of a variable such as fluid rate of flow and by an element positioned responsive to an independent variable for integrating the variable with respect to the independent variable.

5. Apparatus for periodically remotely electrically effecting an actuation, comprising a member positioned by an element which is responsive to the value of a variable such as fluid rate of flow and by an element positioned responsive to an independent variable.

6. An integrating mechanism for electrically integrating a variable with respect to time, comprising a member positioned by a time responsive element and by an element positioned according to a function of the variable.

7. In combination, an electric circuit, a motor in the circuit, and a member positioned by a time responsive element and by an element which is responsive to the value of a variable, the member adapted to control the motor.

8. Apparatus comprising a member positioned by a time responsive element and by an element which is responsive to the value of a variable for periodically remotely electrically effecting an actuation whose duration is proportional to an instantaneous value of the variable.

9. Apparatus comprising a member positioned by a time responsive element and by an element which is responsive to the value of a variable for periodically actuating an electric contact whose actuation is proportional to an instantaneous value of the variable.

10. Apparatus comprising a member positioned by an element which is responsive to the value of a variable and by an element which is responsive to an independent variable for periodically remotely electrically effecting an actuation whose duration is proportional to an instantaneous value of the variable.

11. Apparatus comprising a member positioned by an element which is responsive to the value of a variable and by an element which is responsive to an independent variable for periodically actuating an electric contact whose actuation is proportional to an instantaneous value of the variable.

12. Apparatus comprising a member positioned by an element which is responsive to the value of a variable and by an element which is responsive to an independent variable for periodically closing an electric contact whose time of closure is proportional to an instantaneous value of the variable.

13. Apparatus comprising a member positioned by an element which is responsive to the value of a variable and by an element which is responsive to an independent variable for controlling an electric circuit, the extent of said control dependent upon an instantaneous value of the variable.

14. Apparatus comprising a member positioned by an element which is responsive to the value of a variable and by an element which is responsive to an independent variable for periodically remotely electrically effecting an actuation whose duration is proportional to an instantaneous value of the variable modified by change in such value during the actuation.

15. Apparatus comprising a member positioned by an element which is responsive to the value of a variable and by an element which is responsive to an independent variable for periodically actuating an electric contact whose actuation is proportional to an instantaneous value of the variable modified by change in such value during the actuation.

16. Apparatus comprising a member positioned by an element which is responsive to the value of a variable and by an element which is responsive to an independent variable for periodically closing an electric contact whose time of closure is proportional to an instantaneous value of the variable modified by change in such value during the closure.

17. Apparatus comprising a member positioned by a time responsive element and by an element which is responsive to the value of a variable for periodically remotely electrically effecting an actuation whose duration is proportional to an instantaneous value of the variable modified by change in such value during the actuation.

18. Apparatus comprising a member positioned by a time responsive element and by an element which is responsive to the value of a variable for periodically actuating an electric contact whose actuation is proportional to an instantaneous value of the variable modified by change in such value during the actuation.

19. Apparatus comprising a member positioned by an element which is responsive to the value of a variable and by an element which is responsive to an independent variable for controlling an electric circuit, the extent of such control dependent upon an instantaneous value of the variable modified by change in such value during a certain time interval.

20. In an integrator, a register, a constant speed normally inoperative synchronous motor for driving the register, contact means which when actuated effects operation of the motor, and means for periodically actuating the contact means.

21. In an integrator, a register, a constant speed normally inoperative synchronous motor for driving the register, contact means which when actuated effects operation of the motor, and means for periodically actuating the contact means, said means responsive to the value of a variable to be integrated.

22. In an integrator, a register, a constant speed normally inoperative synchronous motor for driving the register, contact means which when actuated effects operation of the motor, and means for periodically actuating the contact means, said means responsive to an instantaneous value of a variable to be integrated modified in accordance with change in value of the variable during the actuation.

23. In a measuring apparatus, a registering device, a constant speed normally inoperative synchronous motor for actuating the registering device, contact means which when actuated effects operation of the motor, and means for periodically actuating the contact means.

24. Apparatus comprising a member adapted to be freely positioned within limits in a plane, for effecting an actuation whereby an electric circuit is controlled, one end of the member reciprocated at a substantially uniform rate along a given path in the plane, and the other end of the member positioned between limits in accordance with a function of a variable.

25. Apparatus comprising a member adapted to be freely positioned within limits in a plane, for effecting an actuation whereby an electric circuit is controlled, one end of the member reciprocated at a substantially uniform rate along a given path in the plane, the other end of the member positioned between limits in accordance with a function of a variable, the duration of the actuation being proportional to an instantaneous value of the variable modified by change in such value during the actuation.

26. In an integrator, a register, a constant speed normally inoperative synchronous motor for driving the register, contact means which when actuated effects operation of the motor, and means for periodically actuating the contact means, said last-named means comprising a member adapted to be positioned along a definite path in a plane, one end of the member periodically reciprocated at a substantially uniform rate between definite limits of travel, the other end of the member positioned proportional to the value of a variable bteween definite limits of travel, whereby the variable is integrated with respect to time.

27. In a measuring apparatus, a registering device, a constant speed normally inoperative synchronous motor for actuating the registering device, contact means which when actuated effects operation of the motor, and means for periodically actuating the contact means, said last-named means comprising a member adapted to be positioned along a definite path in a plane, one end of the member periodically reciprocated between definite limits of travel, the other end of the member positioned proportional to the value of a variable between definite limits of travel, whereby the variable is integrated with respect to time.

28. Apparatus for controlling an electric motor, comprising in combination, an alternating-current circuit, a self-starting single-phase synchronous motor in the circuit, the motor having a plurality of similar field windings opposedly wound whereby when the windings are energized the motor does not rotate, and a member positioned by a time responsive element and by an element which is responsive to the value of a variable for periodically releasing energization of one of the windings thereby allowing the motor to rotate in predetermined direction.

29. Apparatus for controlling an electric motor, comprising in combination, an alternating-current circuit, a self-starting single-phase synchronous motor in the circuit, the motor having a plurality of similar field windings opposedly wound whereby when the windings are energized the motor does not rotate, and a member positioned by a time responsive element and by an element which is responsive to the value of a variable for periodically releasing energization of one of the windings thereby allowing the motor to rotate in predetermined direction and in amount dependent upon the instantaneous value of the variable at the beginning of the period.

30. Apparatus for controlling an electric motor, comprising in combination, an alternating-current circuit, a self-starting single-phase synchronous motor in the circuit, the motor having a plurality of similar field windings opposedly wound whereby when the windings are energized the motor does not rotate, and a member for periodically releasing energization of one of the windings thereby allowing the motor to rotate in predetermined direction.

31. Apparatus for controlling an electric motor, comprising in combination, an alternating-current circuit, a self-starting single-phase synchronous motor in the circuit, the motor having a plurality of similar field windings opposedly wound whereby when one of the windings is not energized the motor rotates in predetermined direction, and means for substantially instantaneously stopping rotation of the motor comprising a member adapted to complete circuit to energize the non-energized winding.

32. Mechanism for integrating a variable with respect to an independent variable, comprising in combination, means positioned proportional to the value of the variable, means positioned by an element which is responsive to the value of the independent variable, said means effective in controlling an electric circuit, an electric motor in said circuit, and a register adapted to be driven at a substantially uniform speed by said motor.

33. Mechanism for integrating a variable with respect to an independent variable, comprising in combination, means positioned proportional to the value of the variable, means positioned by an element which is responsive to the value of the independent variable, said means effective in establishing an electric circuit, an electric motor in said circuit, and a register adapted to be driven at a substantially uniform speed by said motor.

34. Mechanism for integrating a variable with respect to an independent variable, comprising in combination, means positioned proportional to the value of the variable, means positioned by an element which is responsive to the value of the independent variable, said means effective in opening an electric circuit, an electric motor in said circuit, and a register adapted to be driven at a substantially uniform speed by said motor.

35. Mechanism for integrating a variable with respect to time, comprising in combination, means positioned proportional to the value of the variable, means positioned by a time responsive element, said means effective in controlling an electric circuit, an electric motor in said circuit, and a register adapted to be driven at a substantially uniform speed by said motor.

36. Mechanism for integrating a variable with respect to time, comprising in combination, means positioned proportional to the value of the variable, means positioned by a time responsive element, said means effective in controlling an electric circuit, an electric motor having a first field winding in said circuit and a second field winding continuously energized whereby when the first field winding is energized the motor is subjected to equal and opposite torques, and a register adapted to be driven at a substantially uniform speed by said motor.

37. Mechanism for integrating a variable with respect to time, comprising in combination, means positioned proportional to the value of the variable, means positioned by a time responsive element, an electric circuit, said means effective in controlling said circuit, a motor in the circuit, the motor having a plurality of similar field windings which when energized impart to the motor equal and opposite torques whereby the motor does not rotate, and a register adapted to be driven by the motor.

38. Mechanism for integrating a variable with respect to time, comprising in combination, means positioned proportional to the value of the variable, means positioned by a time responsive element, an electric circuit a motor in the circuit, the motor having a plurality of similar field windings which when energized impart to the motor equal and opposite torques whereby the motor does not rotate, a register adapted to be driven by the motor, and means in said circuit positioned by the mentioned means for releasing one of said fields from energization whereby the motor drives the register at a substantially uniform speed.

39. Mechanism for integrating a variable with respect to time, comprising in combination, means positioned proportional to the value of the variable, means positioned by a time responsive element, an alternating-current electric circuit, a single-phase self-starting synchronous motor in the circuit, the motor having a plurality of similar field windings which when energized impart to the motor equal and opposite torques whereby the motor does not rotate, a register adapted to be driven by the motor, and means in said circuit positioned by the mentioned means for releasing one of said fields from energization whereby the motor drives the register at a substantially uniform speed.

40. Mechanism for integrating a variable with respect to time, comprising in combination, means positioned proportional to the value of the variable, means positioned by a time responsive element, an alternating current electric circuit, a single-phase self-starting synchronous motor in the circuit, the motor having a field winding adapted to be energized by said circuit, means positioned by the mentioned means for energizing the motor, and a register adapted to be driven at a substantially uniform speed by the motor.

41. Mechanism for integrating a variable with respect to time, comprising in combination, means positioned proportional to the value of the variable, means positioned by a time responsive element, an alternating-current electric circuit, a single-phase self-starting synchronous motor in the circuit, the motor having a field winding adapted to be energized by said circuit, means positioned by the mentioned means for effecting an energization of the motor of a time duration proportional to the value of the variable, and a register adapted to be driven at a substantially uniform speed by the motor.

42. Mechanism for integrating a variable with respect to time, comprising in combination, means positioned proportional to the value of the variable, means positioned by a time responsive element, an alternating-current electric circuit, a single-phase self-starting synchronous motor in the circuit, the motor having a field winding adapted to be energized by said circuit, means positioned by the mentioned means for periodically effecting an energization of the motor of a time duration proportional to the instantaneous value of the variable at the beginning of the period modified by change in value of the variable during the time of energization, and a register adapted to be driven at a substantially uniform speed by the motor.

43. Mechanism for integrating a variable with respect to time, comprising in combination, means positioned proportional to the value of the variable, means positioned by a time responsive element, an electric circuit, a motor in the circuit, the motor having a plurality of normally energized similar field windings arranged to impart to the motor equal and opposite torques whereby the motor normally does not rotate, circuit-opening means for one of the fields positioned by the mentioned means and adapted to periodically cause a rotation of the motor for a time duration proportional to the value of the variable, and a register adapted to be driven at a substantially uniform speed by the motor.

44. Mechanism for integrating a variable with respect to time, comprising in combination, means positioned proportional to the value of the variable, means positioned by a time responsive element, an electric circuit, a motor in the circuit, the motor having a plurality of normally energized similar field windings arranged to impart to the motor equal and opposite torques whereby the motor normally does not rotate, circuit-opening means for one of the fields positioned by the mentioned means and adapted to periodically cause the rotation of the motor for a time duration proportional to the instantaneous value of the variable at the beginning of the period modified by change in value of the variable during the time of rotation, and a register adapted to be driven at a substantially uniform speed by the motor.

45. In an integrator, a register, a constant speed normally inoperative single-phase self-starting synchronous motor for driving the register, such motor having a plurality of similar field windings which when energized impart to the motor equal and opposite torques whereby the motor does not rotate, contact means which when actuated effects an opening of one of the field windings thereby releasing from the motor one of the equal opposing torques to allow the motor to rotate in a predetermined direction, and means for periodically actuating the contact means, said last-named means comprising a member adapted to be positioned along a definite path in a plane, one end of the member periodically reciprocated between definite limits of travel, the other end of the member positioned proportional to the value of a variable between definite limits of travel, whereby the variable is integrated with respect to time.

46. In a measuring apparatus, a registering device, a constant speed normally inoperative single-phase self-starting synchronous motor for actuating the registering device, such motor having a plurality of similar field windings which when energized impart to the motor equal and opposite torques whereby the motor does not rotate, contact means which when actuated effects an opening of one of the field windings, thereby releasing from the motor one of the equal opposing torques to allow the motor to rotate in a predetermined direction, and means for periodically actuating the contact means, said last-named means comprising a member adapted to be positioned along a definite path in a plane, one end of the member periodically reciprocated between definite limits of travel, the other end of the member positioned proportional to the value of a variable between definite limits of travel.

47. In a measuring apparatus, a registering device, a constant speed normally inoperative single-phase self-starting synchronous motor for operating the registering device, such motor having a plurality of similar field windings which when energized impart to the motor equal and opposite torques whereby the motor does not rotate, contact means which when actuated effects an opening of one of the field windings, thereby releasing from the motor one of the equal opposing torques to allow the motor to rotate in a predetermined direction, and means for periodically actuating the contact means, said last-named means comprising a member adapted to be positioned along a definite path in a plane, one end of the member positioned by an element which is responsive to an independent variable, the other end of the member positioned proportional to the value of a variable.

48. In an integrator, a register, a constant speed normally inoperative single-phase self-starting synchronous motor for driving the register, the motor having a field winding connected in an alternating-current circuit, contact means positioned in the circuit which when closed causes the motor to rotate, and means for periodically actuating the contact means, said last-named means comprising a member adapted to be positioned along a definite path in a plane, one end of the member periodically reciprocated between definite limits of travel, the other end of the member positioned proportional to the value of a variable between definite limits of travel, whereby the variable is integrated with respect to time.

49. In an integrator, a register, a constant speed normally inoperative single-phase self-starting synchronous motor for driving the register, the motor having a field winding connected in an alternating current circuit, contact means positioned in the circuit which when closed causes the motor to rotate, and means for periodically actuating the contact means, said last-named means comprising a member adapted to be positioned along a definite path in a plane, one end of the member positioned by an element which is responsive to an independent variable, the other end of the member positioned proportional to the value of a variable.

50. An integrating device comprising in combination, an electrically operable register, a member adapted to be positioned between limits in a plane, measuring apparatus of a variable for positioning one end of the member and in amounts proportional to the value of the variable to be integrated with respect to time, and a constantly driven cam for periodically reciprocating the other end of the member at a substantially uniform rate between limits in the plane, the member intermediate its ends adapted to actuate the register.

51. An integrating fluid meter comprising in combination, a device for creating a pressure difference bearing a known relation to the rate of fluid flow, a liquid sealed bell positioned responsive to such pressure difference, indicating means of the bell position, a member positioned between limits in one plane by said indicating means, the member further positioned according to function of time, the resultant instantaneous position relative to space of an actuating point of the member being determined as a component of flow and time, registering means for accumulating movements representing quantities of fluid flowing in increments of time, and electric driving means of the register made effective by said member.

52. An integrating fluid meter comprising in combination, a device for creating a pressure difference bearing a known relation to the rate of fluid flow, a liquid sealed bell positioned responsive to such pressure difference, indicating means of the bell position, a member positioned between limits in one plane by said indicating means, the member further positioned according to function of time, the resultant instantaneous position relative to space of an actuating point of the member being determined as a component of flow and time, registering means for accumulating movements representing quantities of fluid flowing in increments of time, a normally inoperative constant speed alternating-current motor for driving the register, and circuit controlling means for the motor positioned by the member.

53. In an integrator, a register, a constant speed normally inoperative single phase self-starting synchronous motor for driving the register, such motor having a plurality of similar field windings opposedly connected in series across an alternating-current supply, thereby when the windings are energized imparting to the motor equal and opposite torques whereby the motor does not rotate, circuit closing means for completing a shunt circuit around one of the field windings thereby releasing from the motor one of the equal opposing torques to allow the motor to rotate in a predetermined direction, and means for periodically actuating the circuit closing means, said last-named means comprising a member adapted to be positioned along a definite path in a plane, one end of the member periodically reciprocated between definite limits of travel, the other end of the member positioned proportional to the value of a variable between definite limits of travel, whereby the variable is integrated with respect to time.

54. Measuring apparatus comprising in combination, a rate of flow meter of a fluid, said meter adapted to move an element in linear relation to rate of fluid flow, a member positioned by the element and by a time responsive element, electric circuit controlling means actuated by the member, and an electrically operable registering device adapted to register such actuation.

In witness whereof, I have hereunto set my hand this 27th day of July, 1931.

REW E. WOOLLEY.